INVENTORS.
KANTILAL P. DESAI
EDWARD J. MOORE

BY McLean, Morton & Boustead

ATTORNEYS.

INVENTORS.
KANTILAL P. DESAI
EDWARD J. MOORE

BY McLean, Morton & Boustead

ATTORNEYS.

United States Patent Office 3,564,914
Patented Feb. 23, 1971

3,564,914
SEQUENTIAL ACOUSTIC AND ELECTRICAL RESISTIVITY WELL-LOGGING DEVICE
Kantilal P. Desai and Edward J. Moore, Tulsa, Okla., assignors to Sinclair Research, Inc., New York, N.Y., a corporation of Delaware
Filed Aug. 12, 1968, Ser. No. 752,071
Int. Cl. G01v 11/00
U.S. Cl. 73—152　　　　　　　　　　　　　　5 Claims

ABSTRACT OF THE DISCLOSURE

Well-logging apparatus and method utilizing a tool including a plurality of housings, each having acoustic transmitting means, acoustic receiving means, electrical transmitting electrode means, and electrical receiving electrode means. The tool is lowered into a borehole, and the housings contact the borehole wall. The acoustic and electrical transmitting means are sequentially energized, and the signals from the acoustic and electrical receiving means are monitored.

---

The present invention pertains to an apparatus for and a method of making acoustic velocity and electrical resistivity measurements of earth formations. More particularly, the persent invention pertains to an apparatus and method by means of which acoustic velocity and electrical resistivity measurements are made sequentially and continuously at a plurality of points on the face of a well bore.

Much information about underground earth formations can be obtained from electrical resistivity measurements within the formations. This information is of interest in such fields as civil engineering, petroleum engineering, and geophysical prospecting. Electrical resistivity measurements within an earth formation are frequently made by means of an instrument inserted within a borehole which tranverses the earth formation. The resistivity measurements, or well log, disclose dips within the strata making up the formation. Frequently, however, the materials forming the strata have substantially the same resistivities, and so dips of the strata are difficult to detect from the electrical resistivity well log.

The acoustic wave velocities within the different materials forming the strata generally are different. Even in those instances when these acoustic wave velocities in the different strata materials may be close to the same value, it is highly unlikely that the materials forming a strata will exhibit both similar electrical resistivities and similar acoustic wave velocities. Thus, the generation of an acoustic wave velocity well log provides useful information about earth formations, and the simultaneous generation of an electrical resistivity well log and an acoustic wave velocity well log enables the generation of extremely accurate profiles of the strata within an earth formation.

Among the earth's mechanical properties of interest are the dynamic elastic moduli. To determine these moduli, information about the density of the earth formation and the velocity of compressional and shear waves in the formation are required. Several methods and apparatus are available for obtaining compressional wave and shear wave velocities and the density of the earth formation; however, these are generally able to measure acoustic velocities through the earth formation only in a direction parallel to the axis of the borehole. The dynamic elastic moduli are vector quantities, and the earth formation is seldom isotropic. Determination of the direction of earth material transport and the deposited grain orientation requires three-dimensional information about these moduli. Consequently, it is desired to obtain a three-dimensional description of the elastic moduli.

The underground formation of interest is frequently at a great depth beneath the surface of the earth. To obtain readings throughout the depth of a borehole, an instrument is lowered into the borehole and readings are made as the instrument is either raised or lowered in the borehole. Because of the great depths involved, considerable time and expense are required to make the desired readings. If both acoustic wave velocity readings and electrical resisitivity readings are desired, two traversals of the borehole greatly increases the time and expense. Thus, it is desirable to be able to perform both electrical resistivity measurements and acoustic wave velocity measurements during a single traversal of the borehole.

The present invention is an apparatus for and method of making acoustic velocity measurements and electrical resistivity measurements within a borehole during one traversal of the borehole. The apparatus includes a plurality of housings which are pressed against a wall of the borehole. One housing includes both electrical and acoustic transmission elements. Another housing includes both electrical and acoustic receiving elements. Energy is transmitted through the earth formation sequentially from the electrical transmission element and the acoustic transmission element. This energy is received in turn by the electrical and acoustic receiving elements and is amplified and applied to conventional processing and recording equipment outside the borehole. This processing and recording equipment also receives such information as caliper response, azimuth, inclination, and drift of the apparatus to enable meaningful interpretation of the resistivity and acoustic velocity data.

These and other aspects and advantages of the present invention are apparent in the following detailed description claims, particularly when read in conjunction with the accompanying drawings, in which like parts bear like reference numerals. In the drawings:

Figure 1:
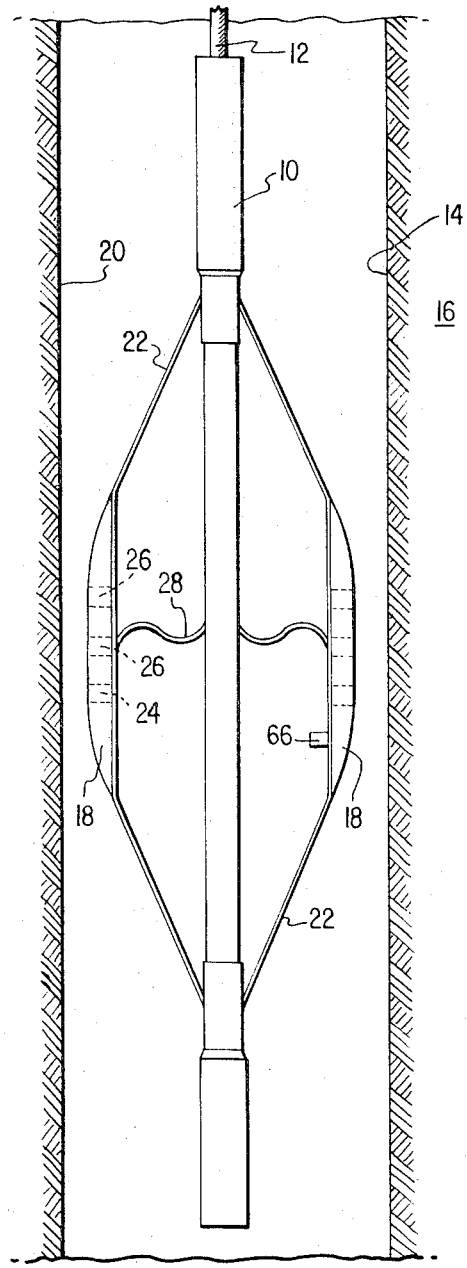
FIG. 1 is an elevational view, partially in section, of the apparatus of the present invention within a borehole.
Figure 2:
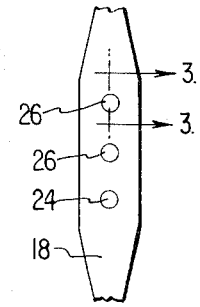
FIG. 2 is a fragmentary side-elevational view of the apparatus.

In that form of the present invention chosen for purposes of illustration in FIGS. 1 and 2, a subsurface instrument 10 is suspended by means of cable 12 within a borehole 14 which traverses earth formation 16. Instrument 10 includes a plurality of supports or pads 18, for example three radially equispaced supports or pads 18, each of which is urged outwardly by means such as bow springs 22 to press the pads 18 against the wall 20 of borehole 14. Each pad 18 encloses one or more transmitting housing 24 and one or more receiving housings 26. Illustratively, each pad 18 depicted in FIG. 1, includes one transmitting housing 24 and two receiving housings 26. Electrical connections from housings 24 and 26 are provided by means of cable 28 which passes out of borehole 14 within cable 12.

Figure 3:
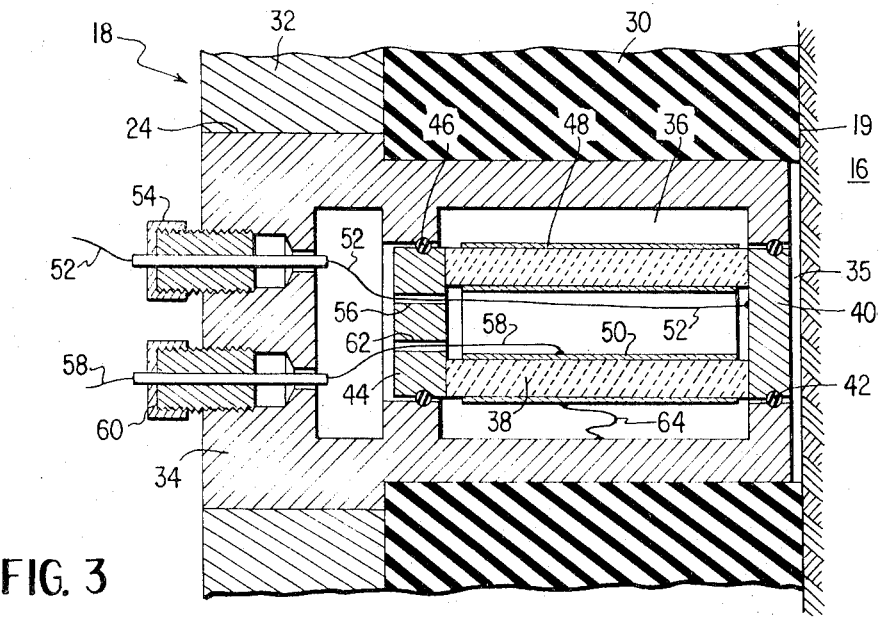
FIG. 3 is an enlarged, fragmentary, sectional view taken along line 3—3 of FIG. 2.

FIG. 3 depicts in detail a housing 24 within its pad 18 and is representative of the manner in which each of the housings 24 and 26 is placed within the pads 18. Each pad 18 includes a first portion 30 of a semi-rigid material such as rubber which can be deformed to fit the shape of the inner surface of the borehole while still providing support for the housings 24 and 26. This semi-rigid material absorbs energy which is applied to it, rather than permitting that energy to travel through it. Portion 30 is surrounded by a metal frame 32 upon which pressure may be made to bear by means of bowed springs 22 to force pad 18 firmly against the inner surface of borehole 14.

Housing 24 includes a rigid outer shell 34 of an electrically conducting material such as brass. Within central opening 36 of shell 34 there is located an electroacoustic transducer 38 which, for example, might be a piezoelectric crystal. Metallic disc 40 is attached to the outer end of transducer 38 and is supported within and electrically isolated from shell 34 by O-ring 42. Similarly, disc 44 is connected to the inner end of transducer 38 and is supported within and electrically isolated from shell 34 by O-ring 46. Disc 44, which is a rigid material such as ceramic or metal, provides support for transducer 38 and attenuates acoustic waves generated by the transducer to avoid ringing. The outer cylindrical surface of transducer 38 is covered by a thin metal sheet material 48 which, for example, might be a brass shim stock. Similarly, the inner surface of transducer 38 is covered by thin metal sheet material 50 which, likewise, might be a brass shim stock. Electrically conductive wire 52 passes through feed through insulator bushing 54 in shell 34, passes through opening 56 in disc 44, and is connected to the inner surface of metal disc 40. Similarly, electrically conductive wire 58 passes through shell 34 by means of feed through insulator bushing 60, passes through opening 62 in disc 44, and is attached to layer 50 on the inner surface of transducer 38. If disc 44 is an electrically conductive material such as metal, then wires 52 and 58 are insulated where they pass through disc 44. The metallic sheet 48 on the outer surface of transducer 38 is electrically connected to shell 34 by means of wire 64. Wires 52 and 58 are connected to proper surface equipment by means of cable 28 which passes out of borehole 14 within cable 12.

Figure 4:
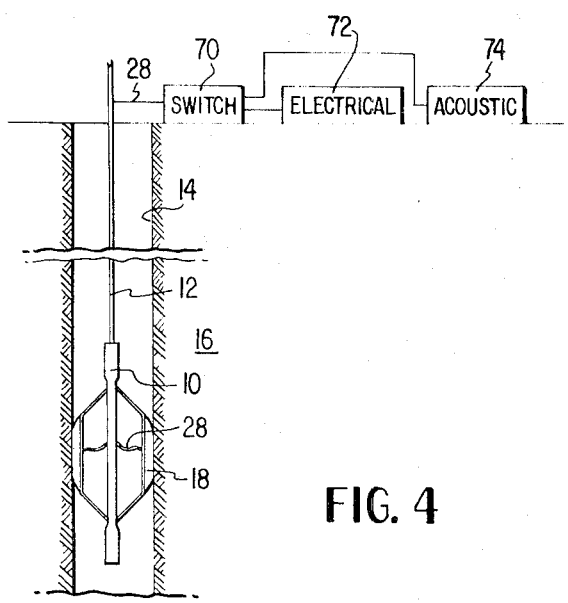
FIG. 4 is a broken elevational view, partially in section, of the apparatus showing its attachment to electrical equipment outside the borehole.

As seen in FIG. 4, cable 28 emerges from cable 12 near the earth's surface and connects each of the wires 52 and 58 from each housing 24 and 26 through switch 70 and alternatively to electrical resistivity equipment 72 or to acoustic wave velocity equipment 74. Equipments 72 and 74 each include electrical energy sources and electrical test equipment such as processing and recording equipment. The several wires comprising cable 28, of course, necessitate use of a multi-pole switch for switch 70 which is depicted in FIG. 4 in block form for purposes of clarity. Preferably, switch 70 is an automated switch such as a commutator switch which automatically switches instrument 10 between electrical resistivity equipment 72 and acoustic wave velocity equipment 74. When it is desired to perform electrical resistivity tests within borehole 14 switch 70 is turned to its first position in which it connects housings 24 and 26 within each pad 18 to electrical resistivity equipment 72 by means of wires 52. Equipment 72 applies an electrical signal to metallic disc 40 within transmitting housing 24, for example an adjustable signal in the order of 100 volts. As a consequence, an electrical current flows from metallic disc 40 within transmitting housing 24, through earth formation 16, to a return current electrode 66 located on the back of pad 18. The potential difference between metallic discs 40 in the two receiving housings 26 is applied to surface equipment 72 by means of wire 52. To permit current to flow, borehole 14 must contain an electrically conductive fluid such as a water base drilling mud.

To perform acoustic wave velocity tests within borehole 14, switch 70 is turned to its second position in which it connects housings 24 and 26 to acoustic wave velocity equipment 74 via the wires 58. Equipment 74 applies a brief electrical pulse to transducer 38 within transmitting housing 24, for example a pulse in the order of 60 volts, for five microseconds. As a consequence, transducer 38 applies a pulse of acoustic energy through disc 40 into earth formation 16. During this acoustic well logging borehole 14 may be dry or may be filled with a fluid such as water base or oil base drilling mud. Housing 34 and disc 40 are recessed within opening 35, a small distance from outer surface 19 of pad 18. This recessed distance is shorter than one wave length of the acoustic energy and is provided to insure no mechanical damage occurs to housing 34 or disc 40 during insertion of tool 10 into borehole 14. This arrangement results in a relatively high signal to noise ratio. Since the recess is less than one wave length, no significant acoustical attenuation occurs. The acoustic energy travels through earth formation 16 and impinges upon the discs 40 of receiving housings 26, where the acoustic energy is converted by transducers 38 to electrical energy which then passes to acoustic equipment 74 via wires 58 within cable 28. Acoustic test equipment 74 might, for example, determine attenuation of the acoustic wave by recording the continuous received wave train or by measuring the amplitudes of any part of the wave. Discs 40 thus serve as electrodes for the electrical resistivity tests and as contacts for transducers 38. Usual amplification, processing and recording of the well log information is performed within instrument 10 and equipment 74.

If switch 70 is an automated switch, the connections from housings 24 and 26 are automatically switched between electrical resistivity equipment 72 and acoustic wave velocity equipment 74 at a regular rate. Then instrument 10 can be lowered to a desired depth within borehole 14, and the apparatus energized. As instrument 10 is withdrawn from borehole 14, electrical resistivity readings and acoustic wave velocity readings are made at substantially identical locations. Thus, during one traversal of borehole 14, a plurality of curves of both the acoustic wave velocity and the electrical resistivity are made. From these multiple curves, dips in the strata within the earth formation are readily detected. If some strata are formed of materials which result in difficulty in detecting the strata by means of one set of these curves, generally that strata can be detected from the other set. Thus, from the two types of logs, each comprising a set of multiple curves, accurate profiles of the strata are obtained.

FIG. 4 depicts electrical resistivity equipment 72 and acoustic wave velocity equipment 74 as separate units. They might, however, be a single unit alternatively switched between electrical contact discs 40 and electroacoustic transducers 38.

Figure 5:
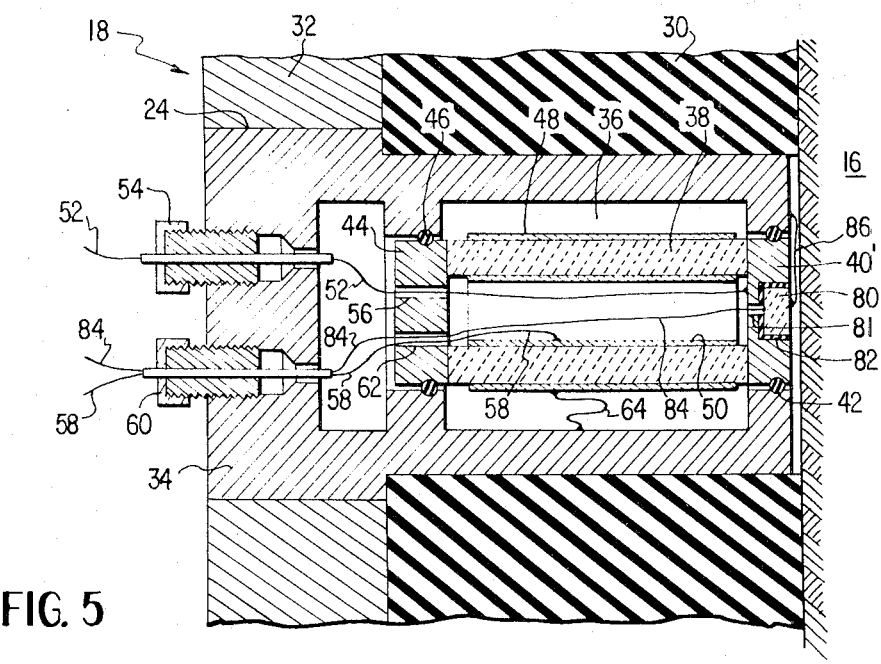
FIG. 5 is a fragmentary side-elevational view of a modified embodiment of the present invention.

Electroacoustic transducer 38 is depicted in FIG. 3 as a tube-shaped transducer. Since its primary mode of expansion is longitudinal, such a transducer primarily generates longitudinal waves. If shear waves are desired, a thin disc-shaped transducer can be utilized. As depicted in FIG. 5 disc shaped transducer 80 is located within central depression 81 in the outer surface of metallic disc 40' and is electrically insulated from disc 40' by sleeve 82 which for example may be of neoprene. The inner surface of transducer 80 is connected to acoustic test equipment 74 via electrically conductive wire 84 and switch 70, while the outer surface of transducer 80 is grounded to shell 34 by wire 86. Of course, if only shear waves are desired, then only transducer 80 need be provided. Such a transducer might be made of AC cut quartz crystal which generates shear waves. If a thin rectangular piezoelectric transducer is used for transducer 80, then longitudinal waves and shear waves are generated simultaneously, and transducer 38 can be omitted. Because the longitudinal waves travel more rapidly and have a higher frequency, the two types of waves are readily distinguished upon receipt and recording. If desired they could be electronically filtered after receipt and separately recorded.

Figure 6:
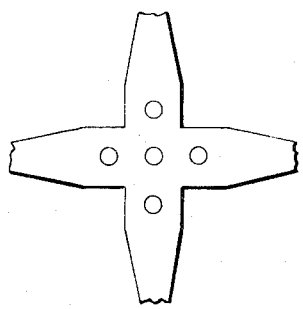
FIG. 6 depicts pad 18 in a modified embodiment which includes housings disposed along two mutually perpendicular axes.

FIG. 6 depicts a modified embodiment of pad 18 which includes housings disposed along two mutually perpendicular axes. This pad permits readings to be made along either a vertical axis of the well bore or radially around the well bore.

Although the present invention has been described with reference to perferred embodiments, numerous modifications could be made and still the resulting apparatus would be within the scope of the invention.

What is claimed is:

1. Well-logging apparatus comprising cable means; a plurality of support means; spring means connecting said support means to said cable means in radially equispaced relation parallel to said cable means, said spring means urging said support means outwardly from said cable means; electrical energy source means connected to said cable means and capable of providing pulses of electrical energy; electrical test equipment connected to said cable means; each support means including:
    (a) acoustic transmitting means electrically connected to said electrical energy source means for generating a pulse of acoustic energy upon application of an electrical pulse, said acoustic transmitting means comprising a tube-shaped electro-acoustic transducer arranged generally perpendicular to the support means and adapted to emit longitudinal acoustic waves;
    (b) acoutsic receiving means spaced apart from said acoustic transmitting means and electrically connected to said electrical test equipment for generating an electrical pulse upon receipt of acoustic energy, said acoustic receiving means comprising at least one tube-shaped electro-acoustic transducer arranged generally perpendicular to said support means and adapted to reversibly transform longitudinal acoustic waves;
    (c) electrical transmitting electrode means attached to said acoustic transmitting means and electrically connected to said electrical energy source means for generating an electrical signal upon application of an electrical pulse, said transmitting electrode means comprising a metallic disc mounted on the outer end of the tube-shaped transducer forming said acoustic transmitting means; and
    (d) electrical receiving electrode means attached to said acoustic receiving means and electrically connected to said electrical test equipment for receiving the electrical signal generated by said transmitting electrode means, said receiving electrode means comprising a metallic disc mounted on the outer end of each of the tube-shaped transducers forming said acoustic receiving means.

2. Well-logging apparatus as claimed in claim 1 in which switching means is connected to said acoustic transmitting means, said acoustic receiving means, said electrical transmitting electrode means, said electrical receiving electrode means, said electrical energy source means, and said electrical test equipment, said switching means, in a first condition, electrically connecting said electrical energy source to said acoustic transmitting means and said electrical test equipment to said acoustic receiving means and, in a second condition, electrically connecting said electrical energy source to said electrical transmitting electrode means and said electrical test equipment to said electrical receiving electrode means.

3. Well-logging apparatus comprising cable means; a plurality of support means; spring means connecting said support means to said cable means in radially equispaced relation parallel to said cable means, said spring means urging said support means outwardly from said cable means; electrical energy source means connected to said cable means and capable of providing pulses of electrical energy; electrical test equipment connected to said cable means; each support means including:
    (a) a first tube-shaped electro-acoustic transmitting transducer electrically connected to said electrical energy source means for generating a pulse of acoustic energy upon application of an electrical pulse, said first tube-shaped transducer arranged generally perpendicular to the support means and adapted to emit longitudinal acoustic waves;
    (b) a second tube-shaped electro-acoustic receiving transducer spaced apart from said first tube-shaped transducer and electrically connected to said electrical test equipment for generating an electrical pulse upon receipt of acoustic energy, said second tube-shaped transducer arranged generally perpendicular to the support means and adapted to reversibly transform longitudinal acoustic waves;
    (c) a first metallic disc electrically connected to said electrical energy source means attached to the outer end of said first tube-shaped transducer and adapted to generate an electrical signal upon application of an electrical pulse, the outer face of said first metallic disc having a central depression and being recessed with respect to the support means;
    (d) a second metallic disc electrically connected to said electrical test equipment attached to the outer end of said second tube-shaped transducer and adapted to receive the electrical signal generated by said first metallic disc, the outer face of said second metallic disc having a central depression and being recessed with respect to the support means;
    (e) a first disc-shaped electro-acoustic transducer electrically connected to said electrical energy source means for generating a pulse of acoustic energy upon application of an electrical pulse, said first disc-shaped transducer located within the central depression of said first metallic disc and adapted to emit shear acoustic waves; and
    (f) a second disc-shaped electro-acoustic transducer electrically connected to said electrical test equipment for generating an electrical pulse upon receipt of acoustic energy, said second disc-shaped transducer located within the central depression of said second metallic disc and adapted to reversibly transform shear acoustic waves.

4. Well-logging apparatus as claimed in claim 3 in which there are a plurality of tube-shaped electro-acoustic receiving transducers as described in (b), each of which includes a metallic disc as described in (d) and a disc-shaped electro-acoustic transducer as described in (f).

5. Well-logging apparatus as claimed in claim 4 in which at least one of said support means is disposed circumferentially about said cable means in an axis perpendicular to that of the other support means.

References Cited
UNITED STATES PATENTS

| | | | |
|---|---|---|---|
| 2,713,147 | 7/1955 | Stripling | 324—1 |
| 2,961,600 | 11/1960 | Tanguy | 324—1 |
| 2,973,472 | 2/1961 | Egan et al. | 324—1 |
| 3,311,876 | 3/1967 | Lee | 340—18 |
| 3,376,950 | 4/1968 | Grine | 181—0.5 |

JAMES J. GILL, Primary Examiner

M. SMOLLAR, Assistant Examiner

U.S. Cl. X.R.

181—0.5; 324—1, 10; 340—17